(12) United States Patent  (10) Patent No.: US 7,192,140 B2
Hosaka  (45) Date of Patent: Mar. 20, 2007

(54) PROJECTOR

(75) Inventor: Toshiyuki Hosaka, Matsumoto (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 10/865,246

(22) Filed: Jun. 10, 2004

(65) Prior Publication Data

US 2005/0018141 A1    Jan. 27, 2005

(30) Foreign Application Priority Data

Jun. 11, 2003    (JP)  .............................. 2003-166835

(51) Int. Cl.
*G03B 21/00*   (2006.01)
*F21V 9/00*    (2006.01)
*F21V 7/04*    (2006.01)
*F21S 4/00*    (2006.01)
*G02F 1/1335*  (2006.01)

(52) U.S. Cl. .................. 353/31; 362/231; 362/555; 362/612; 362/800; 349/69

(58) Field of Classification Search ............... 353/31, 353/30, 33, 34; 362/227, 230, 231, 800, 362/555, 612; 349/61, 69
See application file for complete search history.

(56) References Cited

U.S. PATENT DOCUMENTS 6,547,400 B1   4/2003   Yokoyama ................... 353/98

2005/0063185 A1 *  3/2005   Monjo et al. ................ 362/269

FOREIGN PATENT DOCUMENTS

| JP | 2000/112031 | 4/2000 |
| JP | 2002/174854 | 6/2002 |
| JP | 2002-244211 | 8/2002 |

OTHER PUBLICATIONS

Communication from Korean Patent Office regarding counterpart application 2004-0042609 dated Dec. 23, 2005.

* cited by examiner

*Primary Examiner*—W. B. Perkey
*Assistant Examiner*—Rochelle Blackman
(74) *Attorney, Agent, or Firm*—Harness, Dickey & Pierce, P.L.C.

(57) ABSTRACT

A project is provided that includes a light source including three light emitting units in which a plurality of LEDs are disposed and which emits red light, green light, and blue light. A liquid crystal light valve is provided that modulates the red light, the green light, and the blue light emitted from the light source. The projector is constructed so as to be capable of projecting and displaying an image on a screen by projecting the light modulated by the liquid crystal light valve onto the screen. The light source is constructed with one out of the light emitting units including a different number of LEDs than the other light emitting units so that a ratio between respective amounts of red light, green light, and blue light incident on the liquid crystal light valve with all of the LEDs lit satisfies a predetermined condition.

2 Claims, 2 Drawing Sheets

PROJECTOR

RELATED APPLICATIONS

This application claims priority to Japanese Patent Application No. 2003-166835 filed Jun. 11, 2003 which is hereby expressly incorporated by reference herein in its entirety.

BACKGROUND OF THE INVENTION

1. Field of the Invention

The present invention relates to a projector constructed so as to be able to modulate light emitted from a light source including light emitting diodes and to project and display an image on a screen.

2. Description of the Related Art

To reduce power consumption and apparatus size, a projector that uses high-intensity light emitting diodes (LEDs) as a light source in place of a light source such as a high-pressure mercury lamp has been proposed. As one example of this type of projector, Japanese Laid-Open Patent Publication No. 2002-244211 discloses an image projecting apparatus equipped with LED light sources including a plurality of LEDs. In this case, one LED light source is formed of a plurality of blue LEDs so as to be capable of emitting blue light, one LED light source is formed of a plurality of green LEDs so as to be capable of emitting green light, and one LED light source is formed of a plurality of red LEDs so as to be capable of emitting red light. In this image projecting apparatus, the respective LED light sources are alternately lit in order to emit blue light, green light, and red light in order, and a single-panel light modulating method is used to modulate the blue light, green light, and red light using a liquid crystal light valve in synchronization with the timing with which the LED light sources are alternately lit.

More specifically, when one LED light source is lit, the blue light emitted from the LED light source is polarized by a polarizing conversion element, and is then reflected by a dichroic prism and a polarizing beam splitter and is shone towards a reflective liquid crystal light valve. At this time, the blue light that has been modulated by the liquid crystal light valve (i.e., the modulated blue light) passes a polarizing beam splitter and is projected towards a screen by a projection lens. Similarly, when another LED light source is lit, the green light emitted from the LED light source is polarized by the polarizing conversion element, and is then reflected by a dichroic prism and a polarizing beam splitter and is shone towards a reflective liquid crystal light valve. At this time, the green light that has been modulated by the liquid crystal light valve (i.e., the modulated green light) passes a polarizing beam splitter and is projected towards a screen by a projection lens. Additionally, when yet another LED light source is lit, the red light emitted from the LED light source is polarized by the polarizing conversion element, and is then reflected by a dichroic prism and a polarizing beam splitter and is shone towards a reflective liquid crystal light valve. At this time, the red light that has been modulated by the liquid crystal light valve (i.e., the modulated red light) passes a polarizing beam splitter and is projected towards a screen by a projection lens. In this way, by repeatedly carrying out a process of alternately lighting the LED light sources and modulating the light using a liquid crystal light valve with an extremely short cycle, it is possible to project and display a color display image on a screen.

However, by investigating the image projecting apparatus described above, the present inventor discovered the following problem. That is, in this image projecting apparatus, the LED light sources are respectively composed of the same number of LEDs, and blue light, green light, and red light are emitted in order by alternately lighting these LED light sources. In this case, to project and display the display image on the screen with natural tones (in a state where the white balance has been adjusted), it is necessary to set the ratio between the blue light, the green light, and the red light incident on the liquid crystal light valve at 1:6:3, for example. Also, the luminance (luminous efficiency) respectively differs when red LEDs, green LEDs, and blue LEDs are supplied with currents of equal value. Accordingly, in order to have blue light, green light, and red light emitted from LED light sources equipped with equal numbers of LEDs with respectively different luminances so that the ratio of colored light is 1:6:3, it is necessary to reduce the current supplied to the high luminance LEDs in accordance with the low luminance LEDs so as to reduce the luminance. As a result, since conventional image projecting apparatuses are equipped with equal numbers of high luminance LEDs and low luminance LEDs regardless of the supplied current being reduced to reduce the luminance, there is the problem that the manufacturing cost of such apparatuses is high.

SUMMARY OF THE INVENTION

The present invention was conceived in view of the problem described above, and it is a principal object of the invention to provide a projector whose manufacturing cost can be reduced.

A projector according to the present invention includes: a light source including a first light emitting unit in which a plurality of LEDs are disposed and which emits red light, a second light emitting unit in which a plurality of LEDs are disposed and which emits green light, and a third light emitting unit in which a plurality of LEDs are disposed and which emits blue light; and a light modulating unit that modulates the red light, the green light, and the blue light emitted from the light source, the projector being constructed so as to be capable of projecting and displaying an image on a screen by projecting light modulated by the light modulating unit onto the screen, wherein the light source is constructed with one out of the first light emitting unit, the second light emitting unit, and the third light emitting unit including a different number of LEDs as compared to the other light emitting units so that a ratio between respective amounts of red light, green light, and blue light incident on the light modulating unit in a state where all of the LEDs are lit satisfies a predetermined condition. Here, the light quantity ratio that satisfies the predetermined condition includes various light quantity ratios, such as a light quantity ratio at which the display image can be displayed with natural tones (as one example, a light quantity ratio for the red light, the green light, and the blue light of 24:70:6).

In this projector, the numbers of LEDs in the respective light emitting units are set so that when all of the LEDs are lit (i.e., emit light), red light, green light, and blue light are emitted from the respective light emitting units with a ratio of 24:70:6, for example. Accordingly, unlike the conventional construction where luminance is reduced by supplying currents of different value to the respective light emitting units, the light emitting performance of all of the LEDs can be sufficiently utilized and the respective light emitting units can be composed of the minimum required number of LEDs, so that a considerable reduction can be made in the manufacturing cost of the projector.

In this case, the light source should preferably include tone adjusting LEDs that are controlled and lit separately from the LEDs disposed so as to satisfy the predetermined condition and are used to increase an amount of at least one out of the red light, the green light, and the blue light. With this construction, when changing the image to be projected and displayed on a screen to warm tones, the tone adjusting LEDs (red LEDs) for increasing the amount of red light are lit. By doing so, the amount of red light incident on the light modulating unit is increased, so that it is possible to easily change the tones of the display image to warm tones (an image whose entire image region is reddish) without changing the value of the currents supplied to the LEDs in the respective light emitting units.

Also, the light source should preferably be constructed so that some of the LEDs disposed so as to satisfy the predetermined condition can be controlled and extinguished separately from the other LEDs to reduce an amount of at least one out of the red light, the green light, and the blue light. With this construction, when changing the tones of the display image projected and displayed on the screen to warm tones, some of the LEDs that emit green light and some of the LEDs that emit blue light are extinguished. In this case, the green light and the blue light incident on the light modulating unit are reduced, so that it is possible to easily change the tones of the display image to warm tones (an image whose entire image region is reddish) without changing the value of the currents supplied to the LEDs in the respective light emitting units.

BRIEF DESCRIPTION OF THE DRAWINGS

These and other objects and features of the present invention will be explained in more detail below with reference to the attached drawings, wherein.

DETAILED DESCRIPTION

A preferred embodiment of a projector according to the present invention will now be described with reference to the attached drawings.

Figure 1:
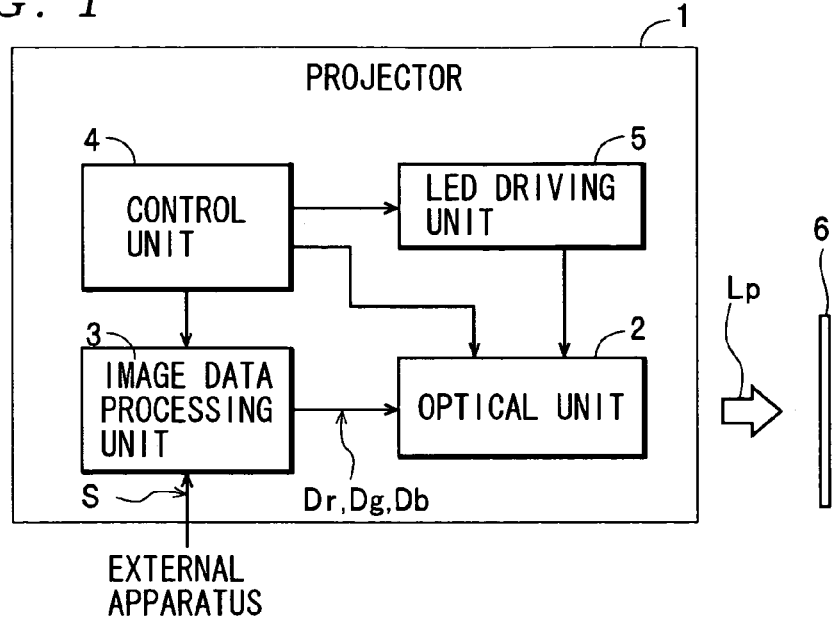
FIG. 1 is a block diagram showing the construction of a projector.
Figure 2:
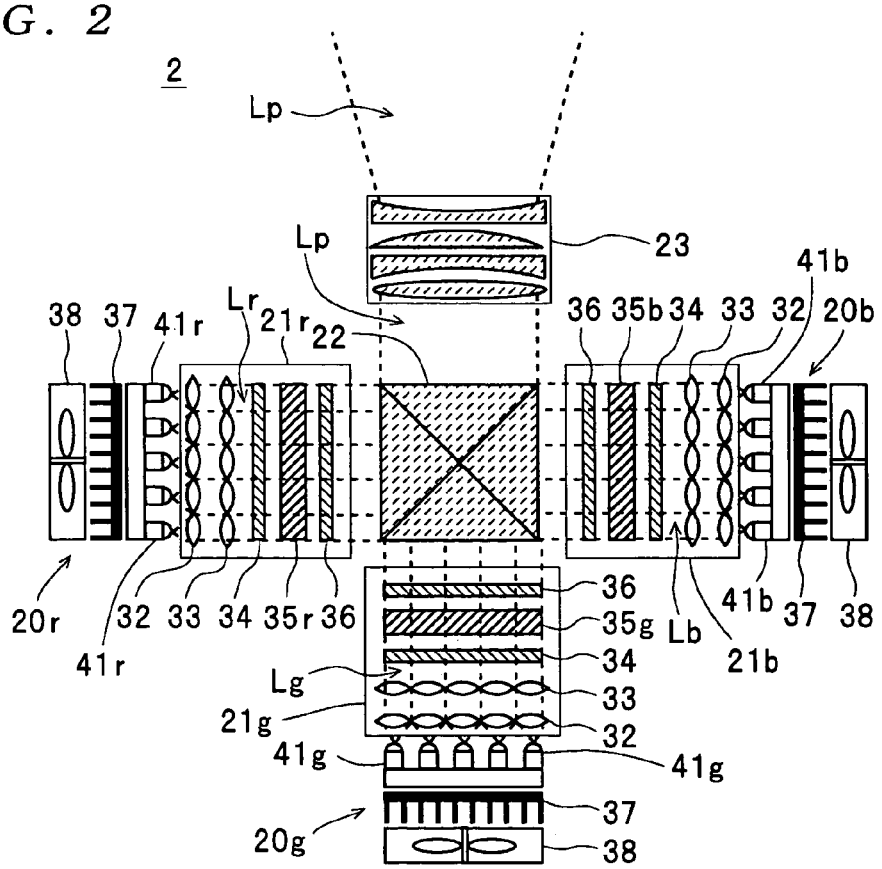
FIG. 2 is a cross-sectional view schematically showing the construction of an optical unit.

The construction of a projector 1 will be described first. The projector 1 shown in FIG. 1 is a three-panel projector that is equipped with three liquid crystal light valves 35, described later, and which separately modulates red light, green light, and blue light before combining the modulated light. The projector 1 is constructed so as to be able to project and display various types of color images on a screen 6 based on an image signal S outputted by an external apparatus (a reproduction apparatus such as a video deck or a DVD player or a personal computer). More specifically, the projector 1 includes an optical unit 2, an image data processing unit 3, a control unit 4, and a LED driving unit 5. It should be noted that in reality, the projector 1 actually also includes an audio signal processing unit, a speaker, and the like, but for ease of understanding the present invention, such components have been omitted from the drawings and the description. As shown in FIG. 2, the optical unit 2 includes LED units 20r, 20g, 20b (hereinafter referred to as the "LED units 20" when no distinction is required), light modulating units 21r, 21g, 21b (hereinafter referred to as the "light modulating units 21" when no distinction is required), a prism 22, and a projection lens 23.

Figure 3:
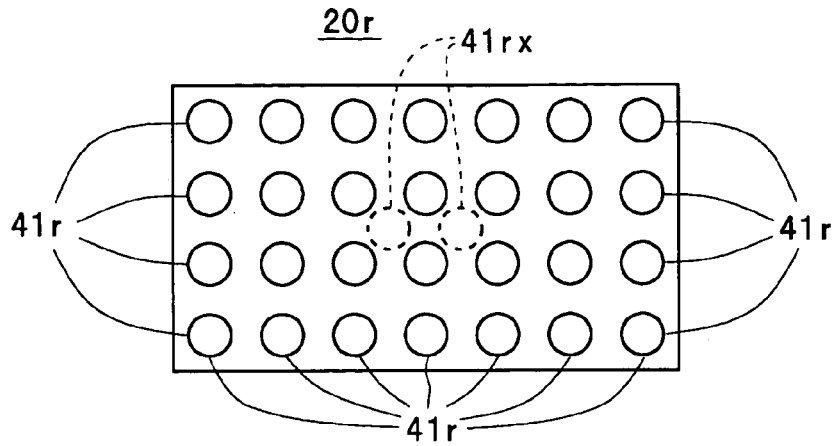
FIG. 3 is a plan view showing the construction of an LED unit.
Figure 4:
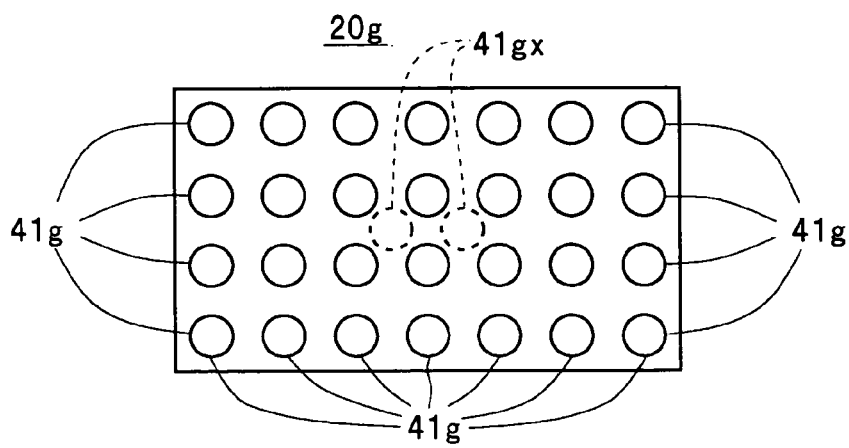
FIG. 4 is a plan view showing the construction of another LED unit.
Figure 5:
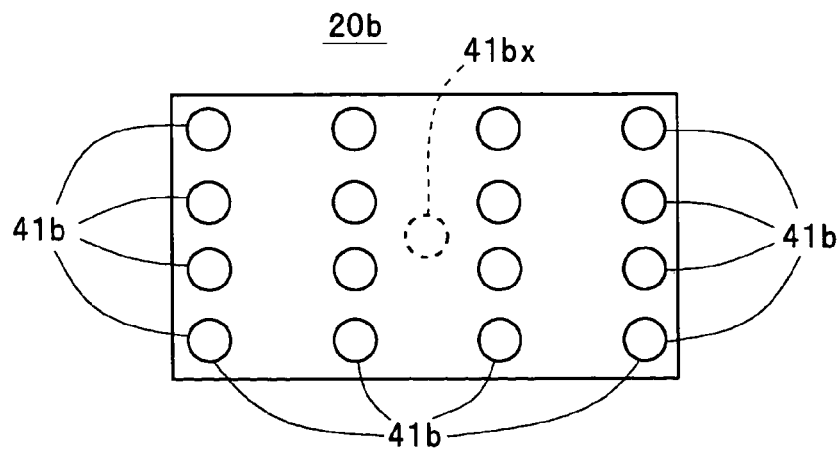
FIG. 5 is a plan view showing the construction of yet another LED unit.

The LED units 20r, 20g, 20b respectively form first to third light emitting units for the present invention, with these collectively forming the "light source" for the present invention. As shown in FIG. 3, the LED unit 20r includes twenty-eight LEDs (red light emitting diodes) 41r, 41r, ... that emit red light Lr (ref. FIG. 2) and are arranged in a matrix, for example, on a substrate. As shown in FIG. 4, the LED unit 20g includes twenty-eight LEDs (green light emitting diodes) 41g, 41g, ... that emit green light Lg (ref. FIG. 2) and are arranged in a matrix on a substrate. Also, as shown in FIG. 5, the LED unit 20b includes sixteen LEDs (blue light emitting diodes) 41b, 41b, ... that emit blue light Lb (ref. FIG. 2) and are arranged in a matrix on a substrate. Also, as shown in FIG. 2, a heat sink 37 and a cooling fan 38 for cooling purposes are attached onto the rear surfaces of the respective substrates of the LED units 20.

Also, in the projector 1, the ratio (hereinafter also referred to as the "number ratio") of the number (in this case, twenty-eight) of LEDs 41r, 41r, ..., the number (twenty-eight) of LEDs 41g, 41g, ... and the number (sixteen) of LEDs 41b, 41b, ... is set in accordance with the ratio (hereinafter also referred to as the "light quantity ratio") of the amount of red light Lr, the amount of green light Lg, and the amount of blue light Lb that should be incident on the liquid crystal light valves 35. In this case, in order to project and display an image on a pure white screen 6 with natural tones (in a state where the white balance has been adjusted), it is necessary to set the light quantity ratio between the red light Lr, the green light Lg, and the blue light Lb incident on the liquid crystal light valves 35 at 24:70:6 (this is one example of a "predetermined condition" for the present invention). In addition, the LEDs 41r, LEDs 41g, and LEDs 41b (hereinafter referred to as the "LEDs 41" when no distinction is required) differ to one another in luminance (for example, the luminance when the LEDs are lit by supplying a current that is around 80% of the maximum allowable current). Accordingly, when the number ratio of the LEDs 41 is set equal to the light quantity ratio at 24:70:6, the light quantity ratio of the light L incident on the liquid crystal light valves 35 does not match the predetermined light quantity ratio (in this case, 24:70:6). For this reason, the projector 1 is designed so as to take in consideration the difference in luminance between the LEDs 41 by having the number ratio set at 7:7:4 so that the light quantity ratio of the light L incident on the liquid crystal light valves 35 becomes 24:70:6.

The light modulating unit 21r is a unit that modulates the red light Lr emitted from the LED unit 20r and, as shown in FIG. 2, includes lens arrays 32, 33, an incident-side polarizing plate 34, a liquid crystal light valve 35r, and an irradiation-side polarizing plate 36. The light modulating unit 21g is a unit that modulates the green light Lg emitted from the LED unit 20g and includes lens arrays 32, 33, an incident-side polarizing plate 34, a liquid crystal light valve 35g, and an irradiation-side polarizing plate 36. The light modulating unit 21b is a unit that modulates the blue light Lb emitted from the LED unit 20b and includes lens arrays 32, 33, an incident-side polarizing plate 34, a liquid crystal light valve 35b, and an irradiation-side polarizing plate 36. In this case, the liquid crystal light valves 35r, 35g, 35b (hereinafter referred to as the "liquid crystal light valves 35" when no distinction is required) form the light modulating means for the present invention.

The lens arrays 32, 33 are integrally formed of a plurality of small-diameter lenses arranged in matrices. In this case, the lens arrays 32, 33 are disposed between the LED units 20 and the liquid crystal light valves 35 and convert the light L (divergent light) emitted from the LED units 20 to parallel light. The lens arrays 32, 33 also function as optical integrators for making the incident light L approximately uniform across the entire regions of the respective liquid crystal light valves 35. The incident-side polarizing plates 34 have approximately the same shape as the liquid crystal light valves 35 and are formed with approximately the same size. The incident-side polarizing plates 34 are disposed between the lens arrays 33 and the liquid crystal light valves 35, and linearly polarize the light converted to parallel light by the lens arrays 32, 33 and make the light incident on the liquid crystal light valves 35. The liquid crystal light valves 35 are transmissive-type light modulating elements, for example, and respectively modulate the red light Lr, the green light Lg, and the blue light Lb based on image data Dr, Dg, Db outputted from the image data processing unit 3. The irradiation-side polarizing plates 36 polarize the light L modulated by the liquid crystal light valves 35. The prism 22 combines the red light Lr, the green light Lg, and the blue light Lb that have been respectively modulated by the liquid crystal light valves 35r, 35g, 35b to generated projection light Lp that is projected to the projection lens 23. The projection lens 23 magnifies the projection light Lp projected by the prism 22 and projects the projection light Lp towards the screen 6.

Based on the image signal S outputted from the external apparatus, the image data processing unit 3 generates the image data Dr for the red components in the display image, the image data Dg for the green components, and the image data Db for the blue components (hereinafter referred to as the "image data D" when no distinction is required) corresponding to the image signal S and outputs the image data D to the optical unit 2 (to the liquid crystal light valves 35). The control unit 4 controls how the LED units 20 are driven by the LED driving unit 5, and also the generation of the image data D and output to the optical unit 2 thereof by the image data processing unit 3. The LED driving unit 5 supplies currents having approximately the same value (as one example, around 80% of the maximum allowable current of the LEDs 41: hereinafter also referred to as the "driving currents") to the respective LED units 20 under the control of the control unit 4.

Next, the overall operation of the projector 1 will be described with reference to the drawings. In the projector 1, when the power is turned on, the LED driving unit 5 supplies the driving current to the respective LED units 20. In accordance with this, the respective LEDs 41 of the LED units 20r, 20g, 20b are lit (emit light) and respectively emit the red light Lr, the green light Lg, and the blue light Lb. In this case, as described above, the projector 1 is designed by setting the number ratio of the LEDs 41 in the LED units 20r, 20g, 20b at 7:7:4, for example, so that the light quantity ratio of the light L incident on the liquid crystal light valves 35 becomes 24:70:6. Accordingly, by merely having the LED driving unit 5 supply driving currents having approximately equal value to the respective LED units 20, it is possible to emit the red light Lr, the green light Lg, and the blue light Lb with the light quantity ratio 24:70:6.

Next, the lens arrays 32, 33 convert the light L emitted from the LED units 20 to parallel light and the incident-side polarizing plates 34 linearly polarize the parallel light produced by the lens arrays 32, 33. After this, the light L is modulated by the liquid crystal light valves 35 based on the image data D outputted by the control unit 4. At this time, the liquid crystal light valve 35r modulates the red light Lr based on the image data Dr, the liquid crystal light valve 35g modulates the green light Lg based on the image data Dg, and the liquid crystal light valve 35b modulates the blue light Lb based on the image data Db. Next, the irradiation-side polarizing plates 36 align the amplitude direction of the light L modulated by the respective liquid crystal light valves 35 and emit the light L to the prism 22. After this, the prism 22 combines the red light Lr, the green light Lg, and the blue light Lb modulated by the respective liquid crystal light valves 35r, 35g, 35b and emits the projection light Lp. After this, the projection lens 23 magnifies the projection light Lp combined by the prism 22 and projects the projection light Lp onto the screen 6. By doing so, the image is displayed in color on the screen 6. In this case, the red light Lr, the green light Lg, and the blue light Lb are incident on the liquid crystal light valves 35r, 35g, 35b with a light quantity ratio of approximately 24:70:6, so that the image is displayed with natural tones.

In this way, according to the projector 1, to make the light quantity ratio of the red light Lr, the green light Lg, and the blue light Lb incident on the liquid crystal light valves 35 in a state where all of the LEDs 41 are lit 24:70:6, the LED unit 20b is constructed with a different number of LEDs 41 to the LED units 20r, 20g, so that by merely lighting all of the LEDs 41 by supplying the respective LED units 20 with driving currents that have approximately equal value from the LED driving unit 5, it is possible to make the light quantity ratio of the red light Lr, the green light Lg, and the blue light Lb 24:70:6 (the desired light quantity ratio). Accordingly, unlike the conventional construction where the supply current is reduced to reduce luminance in accordance with the low-luminance LEDs, the light emitting performance of all of the LEDs 41r, 41g, 41b can be sufficiently utilized and the number of LEDs 41 forming at least one of the LED units 20 (in this case, the LEDs 41b of the LED unit 20b) can be suppressed to the minimum required number. This means that a considerable reduction can be made in the manufacturing cost of the projector 1 corresponding to the reduction in the number of LEDs used in the respective LED units 20. In this case, as the predetermined condition of the present invention, by setting the numbers of LEDs 41 disposed in the respective LED units 20 so that the light quantity ratio of the light incident on the liquid crystal light valves 35 becomes 24:70:6, it is possible to easily project and display a display image with natural tones (i.e., a display image whose white balance has been adjusted).

It should be noted that the present invention is not limited to the embodiment described above. For example, the above embodiment is an example where the number ratio of the LEDs 41r, 41g, 41b is set at 7:7:4 so that the light quantity ratio of the red light Lr, the green light Lg, and the blue light Lb incident on the liquid crystal light valves 35 becomes 24:70:6, but the present invention is not limited to this. More specifically, to input an image signal S with normal tones and project and display a display image with warm tones, it is possible to set the number ratio of the LEDs 41r, 41g, 41b at 8:7:4, for example, so that the light quantity ratio of the red light Lr, the green light Lg, and the blue light Lb incident on the liquid crystal light valves 35 becomes 96:245:21 (another example of the "predetermined condition" for the present invention). Also, to input an image signal S with normal tones and project and display a display image with cool tones, it is possible to set the number ratio of the LEDs 41r, 41g, 41b at 7:7:5, for example, so that the light the light quantity ratio of the red light Lr, the green light Lg, and the blue light Lb incident on the liquid crystal light valves 35 becomes 48:140:15 (another example of the "predetermined condition" for the present invention).

Also, as shown in FIGS. 3 to 5, it is possible to use a construction in which the respective LED units 20 further include LEDs 41rx (tone adjusting LEDs for increasing the amount of red light Lr), LEDs 41gx (tone adjusting LEDs for increasing the amount of green light Lg), and LEDs 41bx (tone adjusting LEDs for increasing the amount of blue light Lb) that can be lit and extinguished separately from the LEDs 41r, 41g, 41b that are normally lit as light sources. In this construction, by lighting one or more of such additional LEDs, it is possible to change the light quantity ratio of the red light Lr, the green light Lg, and the blue light Lb incident on the respective liquid crystal light valves 35. With this construction, it is possible to display a display image whose tones have been adjusted in accordance with the color of the screen 6, the color of any lighting in the periphery of the projector 1, the tones of the image signal S, and the like, without having to change the values of the driving currents supplied to the LEDs 41r, 41g, 41b from the LED driving unit 5.

It is also possible to modify the respective LED units 20 to make it possible to carry out control that extinguishes some of the LEDs 41r, some of the LEDs 41g, and some of the LEDs 41b separately from the control that extinguishes the other normal LEDs 41. With such modified LED units 20, when the normal LEDs 41 are lit, control is carried out to extinguish some of the controllable LEDs mentioned above. As a result, the amount of one of the red light Lr, the green light Lg, and the blue light Lb incident on the respective liquid crystal light valves 35 is reduced, thereby changing the light quantity ratio for the light L of the different colors. By using this construction also, it is possible to display a display image whose tones have been adjusted in accordance with the color of the screen 6, the color of any lighting in the periphery of the projector 1, the tones of the image signal S, and the like, without having to change the values of the driving currents supplied to the LEDs 41r, 41g, 41b from the LED driving unit 5. In this case, the tone adjusting LEDs 41rx, 41gx, 41bx described above may also be provided on the LED units 20.

In addition, although an example of a three-panel projector has been described in the above embodiment of the present invention, the invention can be applied to a single-panel projector where the red light Lr, the green light Lg, and the blue light Lb are modulated by a single liquid crystal light valve. In this case, in place of the LED units 20r, 20g, 20b, it is possible to use an LED unit in which the LEDs 41r, 41g, 41b, . . . are arranged with a predetermined number ratio on a single substrate. Also, the light modulating means for the present invention is not limited to transmissive-type liquid crystal light valves, and various kinds of light modulating elements, such as reflective-type liquid crystal light valves, can be used. In addition, although an example of a "rear-projection type" projector 1 is described in the above embodiment of the present invention, the present invention is not limited to this and can be applied to a "front-projection type" projector.

What is claimed is:

1. A projector comprising:
    a light source including:
        a red light emitting unit, the red light emitting unit including a plurality of red light emitting diodes that emit red light, and a pair of tone adjusting light emitting diodes that are controlled and lit separately from the red light emitting diodes and increase an amount of the red light;
        a green light emitting unit, the green light emitting unit including a plurality of green light emitting diodes that emit green light, and another pair of tone adjusting light emitting diodes that are controlled and lit separately from the green light emitting diodes and increase an amount of the green light;
        a blue light emitting unit, the blue light emitting unit including a plurality of blue light emitting diodes that emit blue light and a single tone adjustting light emitting diode that is controlled and lit separately from the blue light emitting diodes and increases an amount of the blue light; and
    a light modulator that modulates the red light, the green light, and the blue light emitted from the light source, wherein:
        the projector is adapted to project and display an image on a screen by projecting the light modulated by the light modulator onto the screen; and
        the light source is constructed such that the red light emitting unit includes a first quantity of red light emitting diodes;
        the green light emitting unit includes a second quantity of green light emitting diodes;
        the blue light emitting unit includes a third quantity of blue light emitting diodes, and
        the first and second quantities are equal, and the third quantity is less than the first and second quantities so that a ratio between respective amounts of red light, green light, and blue light incident on the light modulator with all of the light emitting diodes lit satisfies a predetermined condition.

2. The projector according to claim 1, wherein the light source is constructed so that some of the red, green, and blue light emitting diodes can be controlled and extinguished separately from the other red, green, and blue light emitting diodes to reduce an amount of at least one out of the red light, the green light, and the blue light.

* * * * *